ated June 26, 1956

2,752,387
LIQUID ACRYLIC ESTER TELOMERS WITH ISOPROPYLATED BENZENE AND PROCESS FOR THEIR PRODUCTION

Chessie E. Rehberg, Glenside, Pa., assignor to the United States of America as represented by the Secretary of Agriculture No Drawing. Application July 29, 1952,
Serial No. 301,615

10 Claims. (Cl. 260—475)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to liquid, low-molecular weight telomers of a lower alkyl acrylate wherein the alkyl group contains 2 to 4 carbon atoms, and to methods for their preparation. It has among its objects the provision of such telomers which are stable to heat, light, moisture, and oxidizing agents and are useful as plasticizers, softeners, and synthetic lubricants.

According to the invention, an isopropylated benzene, particularly triisopropylbenzene, p-cymene, and cumene, is maintained at substantially its atmospheric boiling point while there is dissolved therein a monomeric lower alkyl acrylate wherein the alkyl group contains 2 to 4 carbon atoms, particularly ethyl and butyl acrylate, the monomeric lower alkyl acrylate being added at a rate substantially equal to the rate at which the acrylate polymerizes in the isopropylated benzene solvent. As a result, there is produced a stable, low-molecular weight, liquid, lower alkyl polyacrylate which is a telomer of the particular isopropylated benzene used and which has a boiling point in the range of about from 72° to 178° C. at a pressure of about 0.01 mm. of mercury. By this is meant that the isopropylated benzene acts as a chain-transfer agent, interrupting the growth of the polymer chains, or a significant proportion of them, by furnishing a hydrogen atom to terminate the growing chain and simultaneously forming a new free radical that initiates a new polymer chain. By this mechanism, a telomer is formed which may be represented by the formula R—(M)$_x$—H wherein RH is the isopropylated benzene, M is the monomer used, and $x$ is the number of monomer molecules entering into a particular polymer molecule.

Although an isopropylated benzene is particularly preferred as the chain-transfer agent, other alkylated benzenes such as toluene, xylene, mesitylene, pseudocumene, cymene, ethylbenzene, mono-, di-, and tri-sec. butylbenzene, and, in general, any mono- or poly-alkylbenzene wherein the alkyl groups are primary or secondary; that is, the alkyl groups have at least one hydrogen atom on the carbon atom attached to the aromatic nucleus, may be used. Other alkylated aromatic hydrocarbons, such as the alkylated naphthalenes, may also be used.

The alkyl groups on the aromatic nucleus of the chain-transfer agent may be any primary or secondary alkyl groups, and there may be one, two, three, or more such groups on the nucleus. In general, the secondary alkyl groups are more effective than the primary ones, and the di- and tri-substituted chain-transfer agents are more effective than the mono-substituted ones having the same substituent.

It is desirable that the polymer formed be soluble in the reaction mixture. Otherwise, the polymer separates as fast as formed and further polymerization occurs in this separate polymer phase until a high-molecular weight, solid polymer is formed.

The effectiveness of any of these chain-transfer agents in the production of low-molecular weight telomers is increased by elevation of the temperature at which the polymerization is conducted. A temperature at or near the boiling point of the solution is usually preferred. The effectiveness is also increased by the use of high chain-transfer agent-monomer ratios.

Polymerization may be initiated by any of the known means, as by heat, light, or the addition of a catalyst, such as an organic peroxide, which generates free radicals at the temperature of the polymerization and which is soluble in the mixture of monomer, polymer and chain-transfer agent.

The process is illustrated by the following examples:

Example I

Two volumes of p-cymene and one volume of butyl acrylate were placed in a flask fitted with a reflux condenser and heated to boiling (162° C.). After being refluxed for 5 hours, during which time the temperature rose to 177°, the solution was transferred to a Vigreux still with which the cymene was distilled off, first at 70° (20 mm.) and finally at 30° (2 mm.). The liquid polymeric residue was then transferred to an alembic still and 15 g. of material boiling at 100–200° (0.10 mm.) was distilled off, the final temperature of the residue being 280°. At this temperature, slight decomposition of the residue was evidenced by visible smoke in the still.

The polymeric residue was a light yellow, sirupy liquid having $n_D^{20}$, 1.4692; $d_4^{20}$, 1.0413; viscosity 12.46 poises at 20°. It amounted to 91 g., or 78% of the weight of acrylate monomer used.

Example II

The materials and procedure were substantially the same as in Example I except that cumene was used instead of cymene; reaction temperature was 150–54°. After removal of the cumene at 51° (17 mm.) only about 4% of the polymer could be distilled at 120–155° (0.01 mm.) with a final pot temperature of 240°. There was no evidence of decomposition or discoloration at 240°. The residue of 100 g. (89% of the monomer used) was a viscous, odorless, almost colorless sirup, having $n_D^{20}$, 1.4673; $d_4^{20}$, 1.0414; viscosity at 20°, 17.37 poises; C, 65.81 and H, 9.49.

Example III

Using substantially the same procedure as in Example I except that triisopropylbenzene was used instead of p-cymene (reaction temperature, 175–240°), a clear, odorless, colorless, liquid polymeric product was obtained. By heating the product to 253° (0.03 mm.), 25% was distilled. The residue (93 g., 83% of the weight of monomer used) had $n_D^{20}$, 1.4689; $d_4^{20}$, 1.0296; viscosity at 20°, 51.20 poises.

Example IV

The materials and procedure were substantially as in Example I except that 1% by weight, based on monomer, of benzoyl peroxide was dissolved in the monomer solution, an atmosphere of nitrogen was maintained over the solution during the reaction period, and the reaction temperature was kept at 80°. After removal of the p-cymene, the residue was heated to 220° (0.05 mm.). Only about 1% of the polymer was thus distilled, the remainder being a very viscous, colorless liquid having $n_D^{20}$, 1.4690; $d_4^{20}$, 1.0565; and viscosity at 20°, more than 300 poises; yield, 101 g. (90% of monomer used).

Example V

Two volumes of triisopropylbenzene in a flask fitted with stirrer, thermometer, dropping funnel and reflux condenser were heated to 220°. Then one volume of butyl acrylate containing 1.2% by weight of di-t.-butyl peroxide was slowly dropped in. The heat on the flask and the rate of addition of monomer were adjusted to maintain steady reflux during the 75 minute addition period, the temperature being kept at 210–220°. Reflux was continued until the temperature rose to 235° (1 hour). After removal of the triisopropylbenzene under vacuum, the polymeric residue was heated to 245° (0.01–.06 mm.) in the alembic still, during which process 49% of it was distilled. The residue was an odorless, colorless, oily liquid having $n_D^{20}$, 1.4711; $d_4^{20}$, 1.0194; viscosity at 20°, 12.30 poises; saponification equivalent, 162.1; and H equivalent (unsaturation), 3950. It amounted to 358 g., or 69% of the weight of monomer used.

*Example VI*

A mixture of two volumes of triisopropylbenzene and one volume of ethyl acrylate was refluxed for 5 hours, the temperature being 120° at the beginning and gradually rising to 238° at the end.

After removal of the triisopropylbenzene, the polymer was heated to 240° (0.02 mm.) in the alembic still, thus distilling 11% of the polymer. The residue (155 g., 83% of the weight of monomer used) was a very viscous liquid having $n_D^{20}$ 1.4721. Due to the high viscosity of the material, it was not convenient to measure its density and viscosity.

*Example VII*

The procedure was substantially the same as in Example V except that ethyl acrylate was used instead of butyl acrylate; the catalyst concentration was 1.6%; the temperature during addition of the monomer was 175–200° and afterward rose to 237°. By heating to 245° in an alembic still, 44% of the product was distilled at 100° (D.6 mm.) to 208° (0.06 mm.).

The residue was a clear, colorless, odorless, sirupy liquid having $n_D^{20}$, 1.4759; $d_4^{20}$, 1.0832; viscosity at 20°, 373 poises; saponification equivalent, 141.6. It amounted to 312 g., or 75% or the amount of monomer used.

*Example VIII*

The polymeric butyl acrylate distilled in Examples III and V and other similar experiments was collected and redistilled in an alembic still, and several distinct, relatively sharply characterized fractions were obtained. Several properties of these distilled polymers are tabulated below:

| Fraction | Boiling Point | | $n_D^{20}$ | $d_4^{20}$ | Viscosity, Centistokes | | |
|---|---|---|---|---|---|---|---|
| | Temp., °C. | Press., mm. | | | 20° | 40° | 100° |
| 1 | 135 | 0.4 | 1.4871 | 0.9301 | 38.3 | 15.3 | 3.04 |
| 2 | 115 | 0.01 | 1.4820 | .9594 | 63.5 | | |
| 3 | 122 | .01 | 1.4789 | .9639 | 79.5 | 29.7 | 4.86 |
| 4 | 160 | .01 | 1.4718 | .9886 | 115 | | |
| 5 | 172 | .01 | 1.4728 | .9917 | 184 | 58.4 | 7.76 |

*Example IX*

The distilled ethyl acrylate polymer obtained in Example VI and VII and other similar experiments was redistilled as in Example VIII, with the following fractions being isolated:

| Fraction | Boiling Point | | $n_D^{20}$ | $d_4^{20}$ | Viscosity, Centistokes | | |
|---|---|---|---|---|---|---|---|
| | Temp., °C. | Press., mm. | | | 20° | 40° | 100° |
| 1 | 72 | 0.01 | 1.4842 | 0.9542 | 28.7 | 11.9 | 2.5 |
| 2 | 110 | .01 | 1.4819 | .9993 | 126 | 37.5 | 4.9 |
| 3 | 140 | .06 | 1.4770 | 1.0248 | 257 | 64.7 | 6.9 |
| 4 | 156 | .01 | 1.4765 | 1.0387 | 616 | 124.4 | 10.2 |
| 5 | 178 | .01 | 1.4762 | 1.0500 | 1,353 | 239.7 | 14.2 |

Comparison of Example IV with Example I shows that higher temperatures favor the formation of polymers of lower molecular weight. Similarly, comparison of the viscosities of the products of Examples I, II and III show that lower molecular weight polymers are formed in solvents having more alkyl substituents on the aromatic nucleus.

Comparison of Examples III with V, or VI with VII, show that semi-continuous operation in which the monomer is slowly added to the hot solvent favors the formation of low molecular weight polymer. This is doubtless due to the great dilution of the monomer in the solvent. Since the monomer is continuously removed from the solution by conversion to polymer, its concentration never exceeds a small equilibrium value during the course of the polymerization.

While it is convenient to conduct the polymerizations at reflux temperature, lower temperatures may be used. If the temperature used is below about 125° C., it is advisable to add a suitable catalyst, such as an organic peroxide, which is effective at the temperature chosen. Thus, at 80 to about 120°, benzoyl peroxide is satisfactory, while at 110 to about 150° di-tert.-butyl peroxide is preferable because of its greater stability. Above about 150° no catalyst is required and no advantage is attained in using one. In general, it is advantageous to operate at as high a temperature as practicable without resorting to pressure equipment because the reaction proceeds faster and the molecular weight of the product is lower than when the polymerization temperature is lower.

A ratio of about 2:1 is convenient for chain-transfer agent to monomer; a lower ratio yields polymer of higher molecular weight and a solution of higher viscosity, thus causing possible difficulty in agitation, pouring, pumping, etc., of the polymer solution. On the other hand, higher ratios involve larger volumes of chain-transfer agent to process a given volume of monomer. This requires larger vessels, more heating and cooling equipment, and reduced plant capacity. While there are no critical limits to the chain-transfer agent-monomer ratio, I prefer to use 1 to 2 volumes of chain-transfer agent per volume of monomer. Of course, when my preferred technique of gradual addition of monomer to the boiling chain-transfer agent is used, the effective ratio is extremely high because the monomer polymerizes as it is added to the chain-transfer agent, thus keeping the concentration of monomer in the solution very low.

I claim:

1. A process comprising maintaining an isopropylated benzene at substantially its atmospheric boiling point while dissolving therein a monomeric lower alkyl acrylate wherein the alkyl group contains 2 to 4 carbon atoms at a rate substantially equal to the rate at which the said lower alkyl acrylate polymerizes in said isopropylated benzene, thereby producing a stable, low-molecular weight, liquid telomer of the said lower alkyl acrylate which has a boiling point in the range of about from 72° to 178° C. at a pressure of about 0.01 mm. of mercury.

2. The process of claim 1 wherein the isopropylated benzene is triisopropylbenzene.

3. The process of claim 1 wherein the isopropylated benzene is p-cymene.

4. The process of claim 1 wherein the isopropylated benzene is cumene.

5. The process of claim 1 wherein the lower alkyl acrylate is ethyl acrylate.

6. The process of claim 1 wherein the lower alkyl acrylate is butyl acrylate.

7. The process of claim 1 wherein the polymerization is catalyzed by the addition of an organic peroxide to the monomeric lower alkyl acrylate.

8. A stable, low-molecular weight, liquid telomer of a lower alkyl acrylate wherein the alkyl group contains 2 to 4 carbon atoms, said telomer having end-groups derived from an isopropylated benzene and having a boiling point in the range of about from 72° to 178° C. at a pressure of about 0.01 mm. of mercury.

9. The telomer of claim 8 wherein the lower alkyl acrylate is ethyl acrylate and the isopropylated benzene is triisopropylbenzene.

10. The telomer of claim 8 wherein the lower alkyl acrylate is butyl acrylate and the isopropylated benzene is triisopropylbenzene.

References Cited in the file of this patent

UNITED STATES PATENTS

| | | |
|---|---|---|
| 2,204,517 | Strain | June 11, 1940 |
| 2,276,176 | Flint et al. | Mar. 10, 1942 |
| 2,588,398 | Mast et al. | Mar. 11, 1952 |
| 2,603,655 | Strain | July 15, 1952 |

OTHER REFERENCES

Staudinger et al.: Liebig's Ann. Chem. 502 (1933) pgs. 208–14.

Mark et al.: High Polymers, Inter Science (1941), pgs. 392–96.

Rohm & Haas: Monomeric Acrylic Esters, 2nd ed. (1949), pg. 10.

Basu et al.: Proc. Roy. Soc. (London) 202A (1950), pgs. 485–93.